Sept. 20, 1932.    L. A. STEVENSON    1,878,342
EDIBLE CONFECTION
Filed July 20, 1929

INVENTOR
LEVI A. STEVENSON
BY
ATTORNEY

Patented Sept. 20, 1932

1,878,342

UNITED STATES PATENT OFFICE

LEVI A. STEVENSON, OF KALISPELL, MONTANA

EDIBLE CONFECTION

Application filed July 20, 1929. Serial No. 379,848.

This invention relates to edible confections and the primary object is to provide an edible ice cream container, commonly called a "cone", with one or more auxiliary "cones" or containers formed integrally therewith, and of a smaller size, whereby fruits and syrups may be dispensed and sold together with the ice cream, so that the entire unit, when filled, will comprise a "sundae", that can be carried from the store and eaten together with the receptacles that are made as a unit of baked pastry in the same manner as the usual "cones" are made. A further object is to so construct the pastry unit that it will present an ice cream cup adapted to receive a ball of ice cream and will extend laterally above it so as to retain ground nuts or other materials if it is desired to spread them upon the cream. A further object is to provide a multi-receptacle pastry unit which is so designed that it can be formed and baked on molds or irons, and which irons may be separated to free the unit without breaking or cracking the same. Still other and more specific objects will be disclosed in the course of the following specification, reference being had to the accompanying drawing, wherein:

Figure 2:
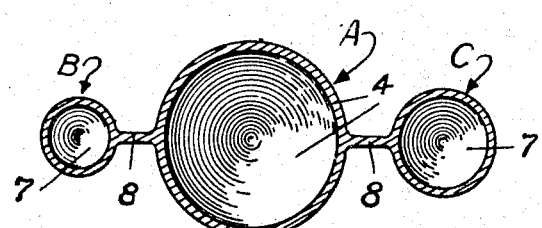
Fig. 2 is a cross section on the line 2—2 in Fig. 1.
Figure 1:
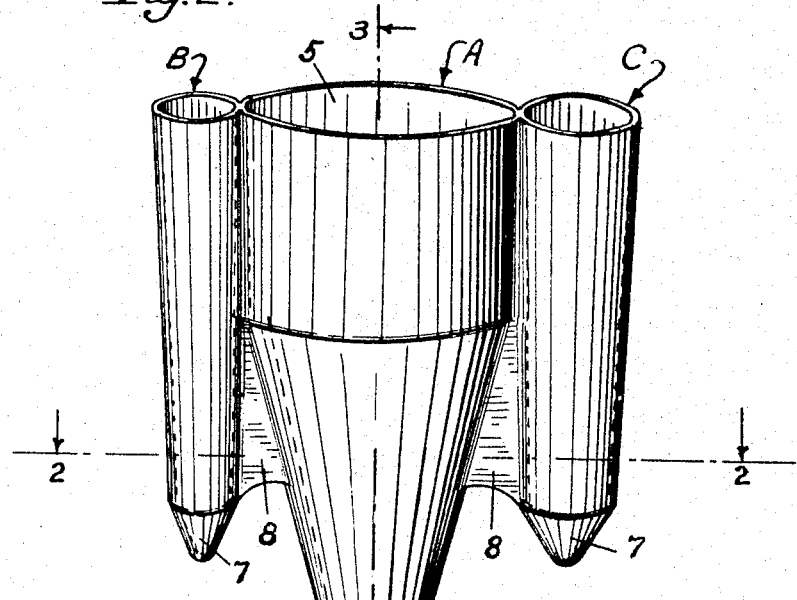
Fig. 1 is a perspective elevation of the device.

Referring to the drawing more particularly and by reference characters, A designates a relatively large central receptacle, with opposite sides of which are integrally formed a pair of smaller receptacles B and C, the receptacle B preferably being slightly smaller than the receptacle C.

Figure 3:
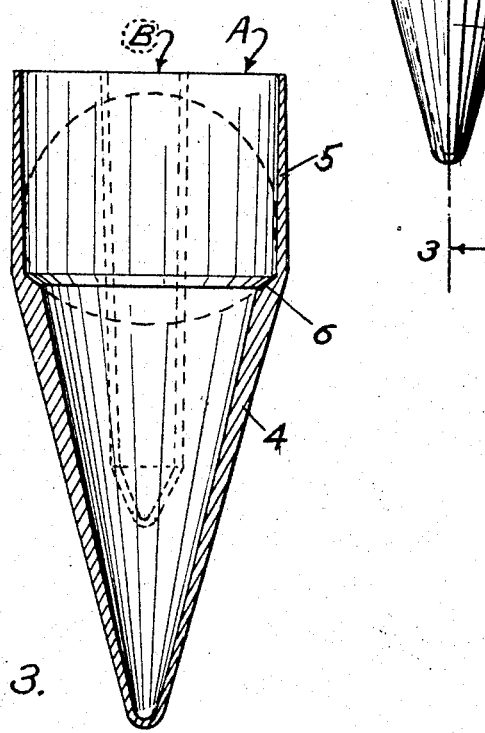
Fig. 3 is a sectional elevation on the line 3—3 in Fig. 1.

The receptacle A comprises a conical portion 4, terminating at its upper end in a substantially cylindrical cup portion 5. The wall of the cup 5 tapers upwardly, as shown in Fig. 3, so that the baking irons may be properly extracted. This taper also results in a slight downward taper of the interior wall surface, with a result that an ice cream ball will slightly wedge itself into place, as indicated by dotted lines in Fig. 3. With the cream ball in this position it will be seen that the upper portion of the cup serves as a guard to retain any nuts or other sweetmeats that may be sprinkled or dropped upon the cream.

The cream ball is further supported by a ledge or shoulder 6 (Fig. 3) that is formed by an enlargement in the wall thickness at the upper end of the cone portion 4.

The walls of the receptacles B and C taper downwardly, as shown so that the outer baking iron can be released downwardly and the inner iron may be released upwardly, and the lower ends of these receptacles are closed by integral end portions 7. The receptacles B and C are substantially parallel to the cup wall 5 and are formed integral therewith at parallel lines of attachment. To reinforce this connection, however, and particularly to lend greater rigidity to the lower ends of the side receptacles, I connect them to the cone portion 4 of the main receptacle by integral web sections 8, which are also slightly tapered so as to be properly releasable from the baking iron.

In use the ice cream ball is preferably first inserted in the cup member 5. As previously noted, nuts or other sweetmeats may be spread on the cream, if so desired, and will be prevented from falling off by the high side walls of the cup. The ledge 6 serves to hold the cream in the proper position, while being eaten. The receptacle C is best adapted for holding stripped or cut up fruit, berries, etc., while the receptacle B, being slightly smaller, is intended for syrups or flavorings.

It is of course understood that the receptacle portions A, B, and C, are intended to be eaten downwardly as their respective contents are eaten, and that the entire device may be eaten if so desired, although the cone portion 4 serves primarily as a handle by which the device is held.

It is further understood that suitable modifications may be made in the structure as disclosed, provided such modifications come within the spirit and scope of the appended claims. Having now, therefore, fully illustrated and described my invention what I claim to be new and desire to protect by Letters Patent is:

1. An edible confection comprising a main receptacle formed of pastry and a pair of relatively smaller auxiliary pastry receptacles attached to the main receptacle at opposite sides thereof, all of said receptacles having tapered walls, said auxiliary receptacles being complete in themselves, independent of material forming the main receptacle, and integrally united at peripheral points to the main receptacle so as to be supported thereby.

2. A device of the character described comprising a main receptacle formed by a cylindrical portion and a depending conical portion, an auxiliary receptacle disposed laterally with respect to and formed integral with the cylindrical portion, and a web member integrally connecting the lower part of the auxiliary receptacle with the said conical portion.

3. A device of the character described formed of edible material and comprising a cup member for holding ice cream, a handle portion extending below the cup member, and a pair of tapered tubular receptacles formed integrally with and disposed at the sides of the cup member, the lower ends of said receptacles depending below the cup member and being joined to the said handle portions by connecting web braces.

Signed at Kalispell, in the county of Flathead, and State of Montana, this 15th day of July 1929.

LEVI A. STEVENSON.